(12) United States Patent
West

(10) Patent No.: US 12,536,453 B1
(45) Date of Patent: Jan. 27, 2026

(54) SYSTEMS AND METHODS FOR IDENTIFYING A USER SESSION

(71) Applicant: Verisign, Inc., Reston, VA (US)

(72) Inventor: Andrew G. West, Reston, VA (US)

(73) Assignee: VeriSign, Inc., Reston, VA (US)

( * ) Notice: Subject to any disclaimer, the term of this patent is extended or adjusted under 35 U.S.C. 154(b) by 1051 days.

(21) Appl. No.: 16/433,724

(22) Filed: Jun. 6, 2019

(51) Int. Cl.
*G06N 20/00* (2019.01)
*G06N 5/046* (2023.01)

(52) U.S. Cl.
CPC .............. *G06N 5/046* (2013.01); *G06N 20/00* (2019.01)

(58) Field of Classification Search
CPC ...... G06N 5/046; G06N 20/00; G06F 16/285; G06F 11/0778; G06F 11/30; G06F 11/3006; G06F 11/3072
See application file for complete search history.

(56) References Cited

U.S. PATENT DOCUMENTS

| | | | |
|---|---|---|---|
| 8,423,538 B1* | 4/2013 | Sadikov | G06F 16/285 707/722 |
| 10,496,649 B1* | 12/2019 | Das | G06F 16/9535 |
| 2018/0102938 A1* | 4/2018 | Yoon | G06F 17/40 |
| 2020/0210504 A1* | 7/2020 | Lai | G06F 16/24578 |

\* cited by examiner

*Primary Examiner* — Casey R. Garner
(74) *Attorney, Agent, or Firm* — McCarter & English, LLP; Michael A. Sartori

(57) ABSTRACT

Systems, methods, and computer readable storage media for identifying a user session are provided. The method can include receiving a plurality of queries from a query server; providing, to the query server, a corresponding response to each query of the plurality of queries; grouping a plurality of clusters, wherein each cluster of the plurality of clusters comprises one or more queries of the plurality of queries and the corresponding response to each of the one or more queries of the plurality of queries, wherein each cluster of the plurality of clusters indicates a different user session.

20 Claims, 5 Drawing Sheets

SYSTEMS AND METHODS FOR IDENTIFYING A USER SESSION

BACKGROUND

1. Technical Field

The present disclosure relates to identification of a user session, and more specifically to clustering information to identify a user session.

2. Introduction

Internet search engines operate by a user or entity entering a query into the search engine, then the search engine provider providing a response corresponding to the query to the user. In using the search engine, a particular user may enter any number of queries as part of a particular user session. However, the identity of the particular user and/or the particular user session may be obfuscated from the search engine provider. For example, the particular user and/or the particular user session may be obfuscated by an intermediary, forms of encryption, or other obfuscation.

One particular type of search engine is a domain name suggestion tool for searching and registering available domain names. The domain name suggestion tool may creatively "spin" a user query, such as by providing a term or combination of terms related to the query, to aid end users or entities to find available domain names relevant to the query. Based on the responses or suggestions returned from the domain name suggestion tool, the end user may enter additional subsequent queries as the end user identifies, refines, or explores the namespace of available domain names.

However, without knowing the identity of the end users, and how the end users react to the responses and suggestions provided, the domain name suggestion tool cannot verify the quality of those responses and suggestions to the user, and likewise may not be able to improve the suggestions or responses based on the actions of the users.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media as a technical solution to the technical problem described. A method for performing the concepts disclosed herein can include receiving a plurality of queries from a query server; providing, to the query server, a corresponding response to each query of the plurality of queries; grouping a plurality of clusters, wherein each cluster of the plurality of clusters comprises one or more queries of the plurality of queries and the corresponding response to each of the one or more queries of the plurality of queries, wherein each cluster of the plurality of clusters indicates a different user session.

A system configured to perform the concepts disclosed herein can include a processor; and a computer-readable storage medium storing instructions which, when executed by the processor, cause the processor to perform a method. The method can include receiving a plurality of queries from a query server; providing, to the query server, a corresponding response to each query of the plurality of queries; grouping a plurality of clusters, wherein each cluster of the plurality of clusters comprises one or more queries of the plurality of queries and the corresponding response to each of the one or more queries of the plurality of queries, wherein each cluster of the plurality of clusters indicates a different user session.

A non-transitory computer-readable storage medium configured as disclosed herein can have instructions stored which, when executed by a computing device, cause the computing device to perform operations which include receiving a plurality of queries from a query server; providing, to the query server, a corresponding response to each query of the plurality of queries; grouping a plurality of clusters, wherein each cluster of the plurality of clusters comprises one or more queries of the plurality of queries and the corresponding response to each of the one or more queries of the plurality of queries, wherein each cluster of the plurality of clusters indicates a different user session.

DETAILED DESCRIPTION

Figure 1:
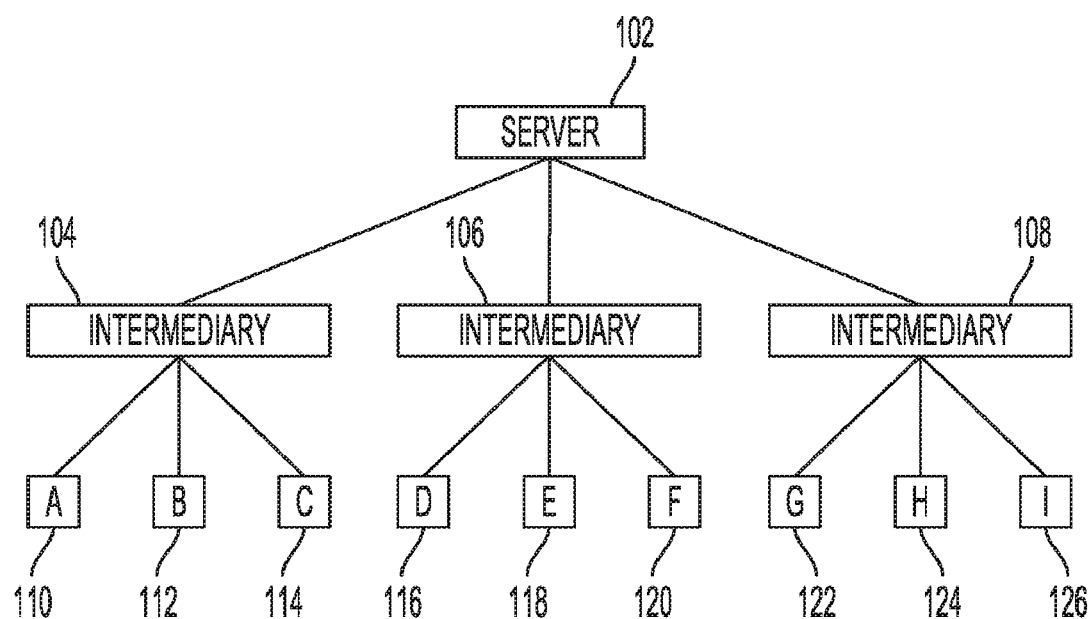
FIG. 1 illustrates an example overview of identifying user sessions using a domain name suggestion tool.

Various embodiments of the disclosure are described in detail below. While specific implementations are described, it should be understood that this is done for illustration purposes only. Other components and configurations may be used without parting from the spirit and scope of the disclosure.

A system, method, and computer-readable media are disclosed which are capable of identifying a user or query session when the user (or users) are not identified, based upon the received queries and provided responses. This may be performed by a system, configured as disclosed by various embodiments herein, clustering queries from unknown users based on commonalities between the search queries. The systems, methods, and computer-readable media disclosed herein can be applied to any suitable online information search service, though some embodiments of this disclosure may be described using a domain name suggestion tool as an exemplary embodiment.

For example, an end user may use a domain name suggestion tool to search for a domain name for registration in a Domain Name System (DNS). The end user may enter a keyword or a domain name as an input string to a response server via the domain name suggestion tool. The response server, via the domain name suggestion tool, may output to the user the availability of the domain name, or of the keyword as a domain name, for registration in the DNS and/or output suggestions of additional and/or available domain names based on the input string. The queries received by the response server during a given period of time may be from a single user session, or from multiple unique users in different user sessions, however the system (in this example) has received no information identifying the unique users providing the queries or their unique respective user sessions. This lack of information about the identity of the user(s), and/or their corresponding respective unique user sessions, generating the queries may be because the users themselves have not provided the information, because of deliberate obfuscation techniques, because the users are using multiple intermediaries to input queries, or for other reasons. However, the end result is the same—the response server may not be able to explicitly distinguish between unique users or their respective user sessions.

To identify the unique users and/or unique user sessions using the techniques disclosed herein, the queries and responses to those queries may be logged in a log file. These logged queries and responses may be clustered together in order to identify a user session. For example, a plurality of queries may generate a plurality of clusters, with an iterative process determining if each subsequent query: (a) joins an existing cluster, or (b) forms the basis of a new cluster. Although embodiments described herein may describe a specific number of clusters, it will be appreciated that the number of clusters may vary depending on, for example, the number of users and/or user sessions. Upon identifying a user session, the response server may extract meaningful information about each user session and the sufficiency of the responses or suggestions provided in response to the respective queries.

As illustrated in FIG. 1, for example, the domain name suggestion tool may be provided by at least one server 102, such as a response server, to a plurality of end users 110, 112, 114, 116, 118, 120, 122, 124, 126 through one or more intermediaries or query servers 104, 106, 108. Although a certain number of servers, end users, and intermediaries or query servers are depicted herein, it is foreseen that any number of servers, end users, and intermediaries or query servers may be used in conjunction with the embodiments described herein, and may be implemented with, for example, a computing device, as described below. For example, the one or more intermediaries or query servers 104, 106, 108 may provide an application programing interface (API) for the plurality of end users 110, 112, 114, 116, 118, 120, 122, 124, 126 to communicate with server 102. Server 102 may expose one or more back-end or structured text APIs to the one or more intermediaries or query servers 104, 106, 108 to allow the plurality of end users 110, 112, 114, 116, 118, 120, 122, 124, 126 to perform queries via a graphical web interface. According to an embodiment, the intermediaries or query servers 104, 106, 108 may be a third party website or a domain name registrar. The API provided at the one or more intermediaries or query servers 104, 106, 108 may be an interface accessible by the end users via the internet. According to an embodiment, the plurality of end users 110, 112, 114, 116, 118, 120, 122, 124, 126 may communicate directly with server 102. According to an embodiment, the server 102 may be one response server or a plurality of response servers in communication with each other.

According to an embodiment, the server 102 may receive queries from the plurality of end users 110, 112, 114, 116, 118, 120, 122, 124, 126 through the respective intermediary or query servers 104, 106, 108 or directly. For the domain name suggestion tool, an end user may provide the queries as text input in the form of a domain name input, such as EXAMPLE.COM, or a keyword, such as EXAMPLE. The response or suggestion provided to the user, as explained below, may also form the basis of a query. For example, the response or suggestion provided by the server 102 to a user, or a segment of the response or suggestion, may be selected by the user as a subsequent query.

After receiving a query from a particular intermediary or query server 104, 106, 108, the server 102 may provide a response or suggestion, responsive to the query, to the particular intermediary or query server 104, 106, 108, which, in turn, provides the response or suggestion to the end user. For example, end user 110 may input a first query into the API of intermediary or query server 104 which sends the first query to the server 102. The server 102 may provide a first response or suggestion, or a plurality of first responses or suggestions, in response to the first query to intermediary or query server 104, which provides the first response or suggestion to the end user 110. The end user 110 may use the provided first response or suggestion as feedback to create a second query in order to obtain a second response or suggestion, or plurality of second responses or suggestions, from server 102. For example, the end user 110 may use or select the provided first response or suggestion, or a portion of the provided first response or suggestion, as a subsequent query. The end user 110 may continue to create any number of new queries based on previous queries or responses or suggestions provided from server 102 during a user session. Similarly, any number of other end users 112, 114, 116, 118, 120, 122, 124, 126 may concurrently and similarly interact with server 102 in their own unique user sessions with the same or different intermediaries or query servers 104, 106, 108.

According to an embodiment, a user session of one end user may be through a single intermediary or query server 104, 106, 108. According to an embodiment, a user session of one end user may be through a two or more intermediaries or query servers 104, 106, 108. For example, end user C 114 may send queries through a first intermediary 104 and a second intermediary 106.

According to an embodiment, each intermediary or query server 104, 106, 108, or the respective API, may have a unique identifier or may be otherwise identifiable by server 102. However, when multiple unique end users engage in respective user sessions on one intermediary or query server 104, 106, 108, the unique identifier for each intermediary or query server 104, 106, 108 obscures the different end users and unique user sessions to the server 102. Similarly, when one end user engages in a single user session across two or more intermediary or query servers 104, 106, 108, the single user session may be obscured to the server 102.

As queries are received at the server 102, the queries may be recorded in a log table or log. For example, the log may include information or log data such as the query and the response or suggestion to the query. According to an embodiment, additional information may be stored in the log, depending on specific configurations, and may include without limitation the time when the query was made, the time when the query was received by the server 102, the time a response was generated by the server 102, an identifier for an intermediary 104, 106, 108 through which the query (and response) was communicated, and/or an identifier of the query server 102 (particularly if a system is combining log data from more than one query server 102).

An example log is shown in Table 1 below. The log may record each query received by server 102, the respective response to each query, and a time associated with each query/response. For example, the time may be when each query was sent by the user or intermediary or when each query was received by the server 102.

TABLE 1

| Time | Query | Response |
| --- | --- | --- |
| $T_1$ | $Query_1$ | $Response_1$ |
| $T_2$ | $Query_2$ | $Response_2$ |
| $T_3$ | $Query_3$ | $Response_3$ |
| ... | ... | ... |
| $T_n$ | $Query_n$ | $Response_n$ |

As illustrated in Table 1, for example, the end users and unique user sessions may not be explicitly identified in the log data recorded by the server 102. As such, prior to this invention, the response server, such as a domain name suggestion tool, may lack the information to identify a unique user session, and therefore the response server may be unable to provide customized suggestions or responses to a particular user, or determine whether the provided suggestions or responses are successful or of added value to the particular user.

According to an embodiment, the server 102 may be configured to record query inputs to and outputs from the server 102, such as queries and corresponding suggestions or responses. According to an embodiment, the server 102 may also record an identifier of an intermediary associated with a query. For ease of description, the logged query and logged information corresponding to the logged query may be referred to as a logged interaction.

According to an embodiment of a domain name suggestion tool provided by a server 102, a user may submit a query to the server 102, such as through an intermediary, to determine if a specific domain (the queried domain name or keyword), e.g., "EXAMPLE.COM," or "EXAMPLE," is available for registration as a domain name in the DNS. The server 102 may provide a response that the specific domain is available as a domain name for registration in the DNS, that the specific domain is unavailable as a domain name for registration in the DNS, and may also provide a suggestion of one or more alternative domain names which are available for registration in the DNS. According to an embodiment, the suggested one or more alternative domain names may be based on or related to the queried domain name or keyword. For example, the system may provide a response that EXAMPLE.COM is not available for registration in the DNS, however EXAMPLE.NET and EXAMPLE.org are available. According to an embodiment, the log file may record "EXAMPLE.COM" as the query, with "NO" as the response and both "EXAMPLE.NET" and "EXAMPLE.org" as the suggested alternative domain names. According to an embodiment, the system may also identify alternative domain names which are synonyms, or similar to, the search for domain name, which are available. For example, the system could provide suggestions of EXEMPLARY.COM, X-AMPLE.COM, or others to the user. All of these suggestions can be saved in the log as a logged interaction, with additional data such as the time of the query, the time of the response, a user reaction to the response/suggestion, and other information corresponding to each query.

According to an embodiment, the server 102 may cluster a plurality of logged interactions, such as queries and respective suggestions or responses, as belonging to a unique user or user session by processing the logged data, as explained in more detail below.

According to an embodiment, the server 102 may collect and aggregate data (e.g., batched data) so that the batched data can be processed to identify logged interactions belonging to a unique user or user sessions, as explained below. Such analysis can be exclusive to the batched data, or can be in conjunction with historical data. According to an embodiment, the data may be analyzed as it is received by the server 102, such as in real-time or near real-time to identify logged interactions belonging to a unique user or user sessions, as explained below.

According to an embodiment, a cluster of logged interactions may represent a unique user session. A single user, for example, may engage in different unique user sessions over the course of time, such as a day, a week, or other period of time. The different user sessions of a single user may be represented by different clusters. Similarly, different user sessions of different unique users may be represented by different clusters.

According to an embodiment, logged data, such as logged interactions, or a query and the corresponding response and time stamp, may be grouped into the clusters based on one or more rules. For example, the one or more rules may be membership rules which determine whether a logged query should be included into a particular cluster. The one or more rules may use the log data of the logged interactions (e.g., when the query is a name that was recently suggested via a separate query), as well as natural-language processing techniques (e.g., using edit distance to find very similar search strings) to determine whether a particular logged interaction is included in a cluster. According to an embodiment, the rules may include, but are not limited to, repeated queries, suggested keywords becoming queried keywords, and string similarity measures leveraging edit distance and common substrings, as explained in more detail below. The different rules, as explained below, may be used in combination with each other to form the clusters in order to identify unique user sessions. If a logged interaction does not satisfy a rule, a new cluster may be formed which identifies a different user session.

According to an embodiment, a membership rule for inclusion into a particular cluster may be a repeated query to the server 102 within a predetermined amount of time. For example, when the server 102 receives a keyword or term of a first query and the keyword or term is repeated in a second query, such as within a predetermined amount of time, the first query and the second query, such as in the form of the respective logged interactions, may be included into a first cluster which indicates a unique user session. For example, the first query and the second query may be sent by different intermediaries, such as intermediary 104 and intermediary 106, or from the same intermediary to the server 102. In other words, the server 102 may receive the first query and the second query from different intermediaries 104, 106 or the same intermediary.

According to an embodiment, another membership rule for inclusion into a particular cluster may be a query to the server 102 that is the same as a previous response or suggestion sent by server 102 within a predetermined amount of time. For example, when the server 102 sends a first response or suggestion in response to a first query, and then receives a second query with a keyword or term that is the same as at least part or all of the first response or suggestion previously sent by server 102, such as within a predetermined amount of time, the first query and the second query, such as in the form of the respective logged interactions, may be included into a first cluster which indicates a unique user session. For example, the first query and the second query may be sent by different intermediaries, such as intermediary 104 and intermediary 106, or from the same intermediary to the server 102. In other words, the server 102 may receive the first query and the second query from different intermediaries 104, 106 or the same intermediary.

According to an embodiment, another membership rule for inclusion into a particular cluster may be a query to the server 102 that is similar to a previous query to the server 102 within a predetermined amount of time. For example, when the server 102 receives a keyword or term of a first query and the keyword or term is similar to a keyword or term of a second query, such as within a predetermined amount of time, the first query and the second query, such as in the form of the respective logged interactions, may be included into a first cluster which indicates a unique user session. For example, the first query and the second query may be sent by different intermediaries, such as intermediary 104 and intermediary 106, or from the same intermediary to the server 102. In other words, the server 102 may receive the first query and the second query from different intermediaries 104, 106 or the same intermediary.

According to an embodiment, another membership rule for inclusion into a particular cluster may be a query to the server 102 that is similar to a previous response or suggestion sent by server 102 within a predetermined amount of time. For example, when the server 102 sends a first response or suggestion in response to a first query, and then receives a second query with a keyword or term that is similar to at least part or all of the first response or suggestion previously sent by server 102, such as within a predetermined amount of time, the first query and the second query, such as in the form of the respective logged interactions, may be included into a first cluster which indicates a unique user session. For example, the first query and the second query may be sent by different intermediaries, such as intermediary 104 and intermediary 106, or from the same intermediary to the server 102. In other words, the server 102 may receive the first query and the second query from different intermediaries 104, 106 or the same intermediary.

According to an embodiment, the server 102 may use a similarity function to determine sufficient similarity, such as above a predetermined threshold, between queries or between a query and a response or suggestion. Example similarity functions include, but are not limited to, a Levenshtein distance (LEV), a longest common subsequence (LCS), and other functions, algorithms, and techniques for determining similarity. For example, the LEV function may be used to determine sufficient similarity between queries or between a query and a response or suggestion. For example, the LEV function may count the number of character insertions, deletions, or substitutions needed to transform a first keyword to a second keyword, and then normalize the output by a maximum length. As another example, LCS function may be used to determine sufficient similarity between queries or between a query and a response or suggestion. The LCS function may identify the longest subsequence of a first keyword to a second keyword.

According to an embodiment, two or more similarity functions, such as both the LEV function and the LCS function, may be used together to determine sufficient similarity between queries or between a query and a response or suggestion. For example, if three or more similarity functions are used, the server 102 may determine sufficient similarity if the majority of similarity functions indicate similarity about a pre-determined threshold.

The log data may be processed sequentially or may be processed out of order based on specific characteristics of the data, with the rules determining when a query should join an existing cluster or if a new cluster should be created for the query. When multiple users use a single intermediary to conduct sessions simultaneously, for example, the different respective user queries can be interleaved in the logged data and the server 102 may use rules to parse different clusters or user sessions.

According to an embodiment, a time-to-live (TTL) or expiration parameter may be used to archive or close clusters having no recent activity. According to an embodiment, the rules may not compare subsequent queries and/or logged interaction to an archived or closed cluster, so that no query and/or logged interaction may be added to an archived or closed cluster. According to an embodiment, the server 102 may determine temporal boundaries of when a user session ends. For example, the TTL or expiration parameter may be in the form of a predetermined amount of time between adding logged interactions to the cluster. For example, if 5 minutes, or another predetermined amount of time, passes after adding a logged interaction to a cluster, the cluster may be closed to addition of new logged interactions and the closed cluster may define a unique user session. According to embodiments, different predetermined amounts of time may be used such as, for example, but not limited to 30 seconds, 1 minute, 3 minutes, 5 minutes, 10 minutes, 15 minutes, 30 minutes, 45 minutes, 1 hour, multiple hours, or other predetermined amounts of time. According to an embodiment, a predetermined amount time configured to avoid incorrect truncation of a user session may be used. For example, a cluster may be considered to be open when the TTL, expiration parameter, or predetermined amount of time has not passed. Alternatively, a cluster may be considered to be closed after the TTL, expiration parameter, or predetermined amount of time has passed. A closed cluster may represent an entire unique user session.

Figure 2:
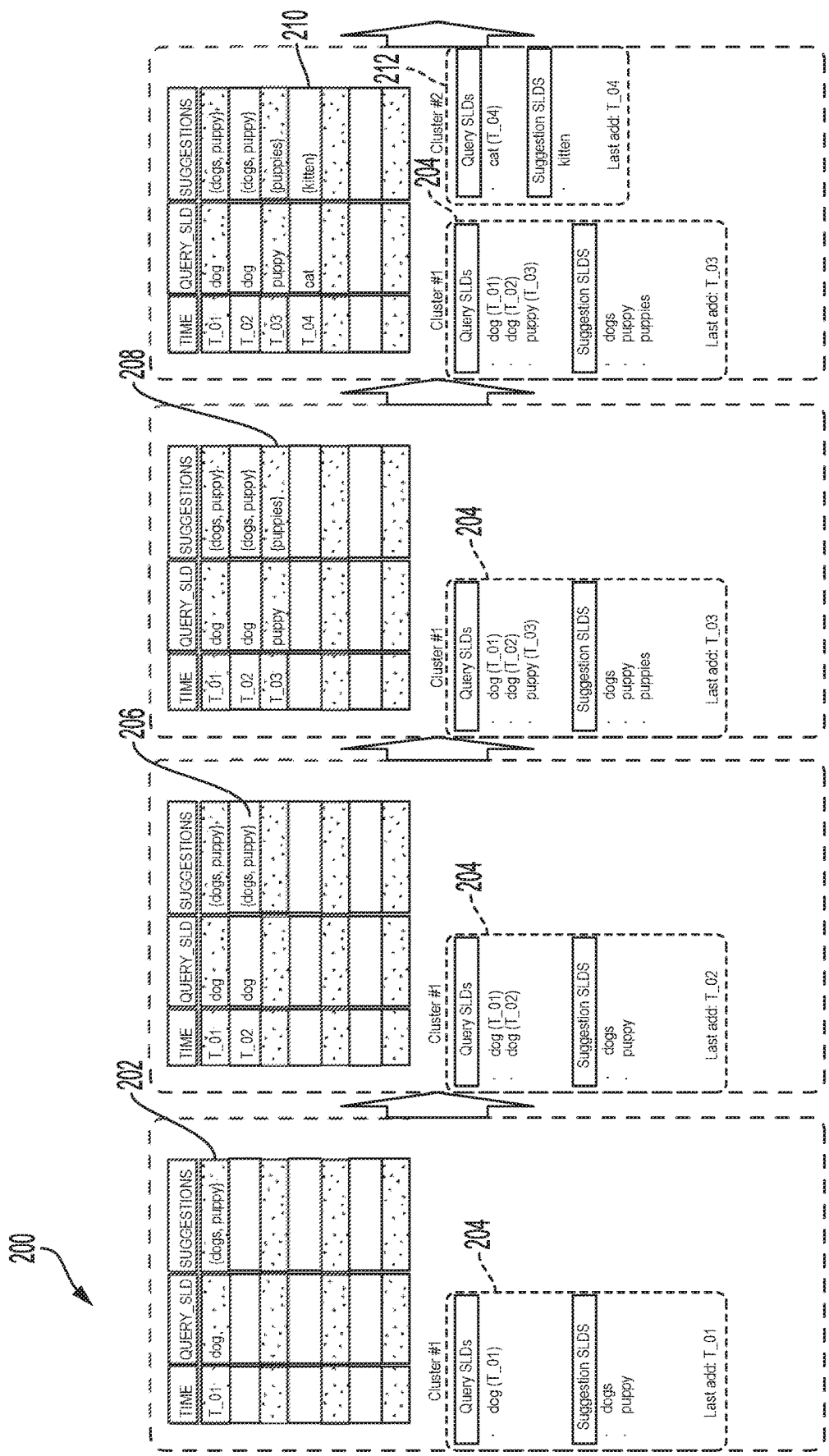
FIG. 2 illustrates a first process flow diagram for identifying a user session.

FIG. 2 illustrates a process flow diagram for identifying a user session. Specifically, FIG. 2 illustrates an example process diagram 200 for identifying user sessions of a domain name suggestion tool by a response server. As explained above, the logged interactions may include, for example, but not limited to, a time stamp, a query (sent by a user and received by the response server), and one or more suggestions corresponding to the query (sent by the response server and received by the user). For example, a first logged interaction 202 may include the query term "dog" and suggestions "dogs" and "puppy" at a first time T_01. Because no clusters have been formed, a first cluster 204 may be formed, and the logged interaction 202 may be included by the response server in the first cluster 204. According to an embodiment, the first cluster 204, and other clusters, may include clustered queries and clustered suggestions.

A second logged interaction 206 includes the query term "dog" and suggestions "dogs" and "puppy" at a second time T_02. Using a membership rule which compares first query term of the first logged interaction 202 with one or more queries and/or one or more suggestions of the existing and open clusters, the second logged interaction 206 may be included by the response server in the first cluster 204 because the second query term of the second logged interaction 206 is the same as at least part or all of one or more queries of the first cluster 204. According to an embodiment, the second time T_02 of the second logged interaction 206 may be within a predetermined time after the first time T_01 of the first logged interaction 202.

A third logged interaction 208 may include the query term "puppy" and suggestion "puppies" at a third time T_03. Using a membership rule which compares the third query term of the third logged interaction 208 with one or more queries and/or one or more suggestions of the existing and open clusters, the third logged interaction 208 may be included by the response server in the first cluster 204 because third query term of the third logged interaction 208 is the same as at least part or all of one or more of the suggestions of the first cluster 204. According to an embodiment, the third time T_03 of the third logged interaction 208 may be within a predetermined time after the second time T_02 of the second logged interaction 206.

A fourth logged interaction 210 may include the query term "cat" and suggestion "kitten" at a fourth time T_04. According to an embodiment, the query term "cat" of the fourth logged interaction 210 is compared with one or more queries and/or one or more suggestions of the existing and open clusters. Because the query term "cat" of the fourth logged interaction 210 is not the same as the query terms or suggestions of the existing and open clusters, a second cluster 212 is formed for the fourth logged interaction 210. According to an embodiment, the response server may determine that the query term "cat" of the fourth logged interaction 210 is not similar enough (e.g. above a predetermined threshold) to the query terms and/or suggestions of the existing and open clusters, so a second cluster 212 is formed for the fourth logged interaction 210.

Figure 3:
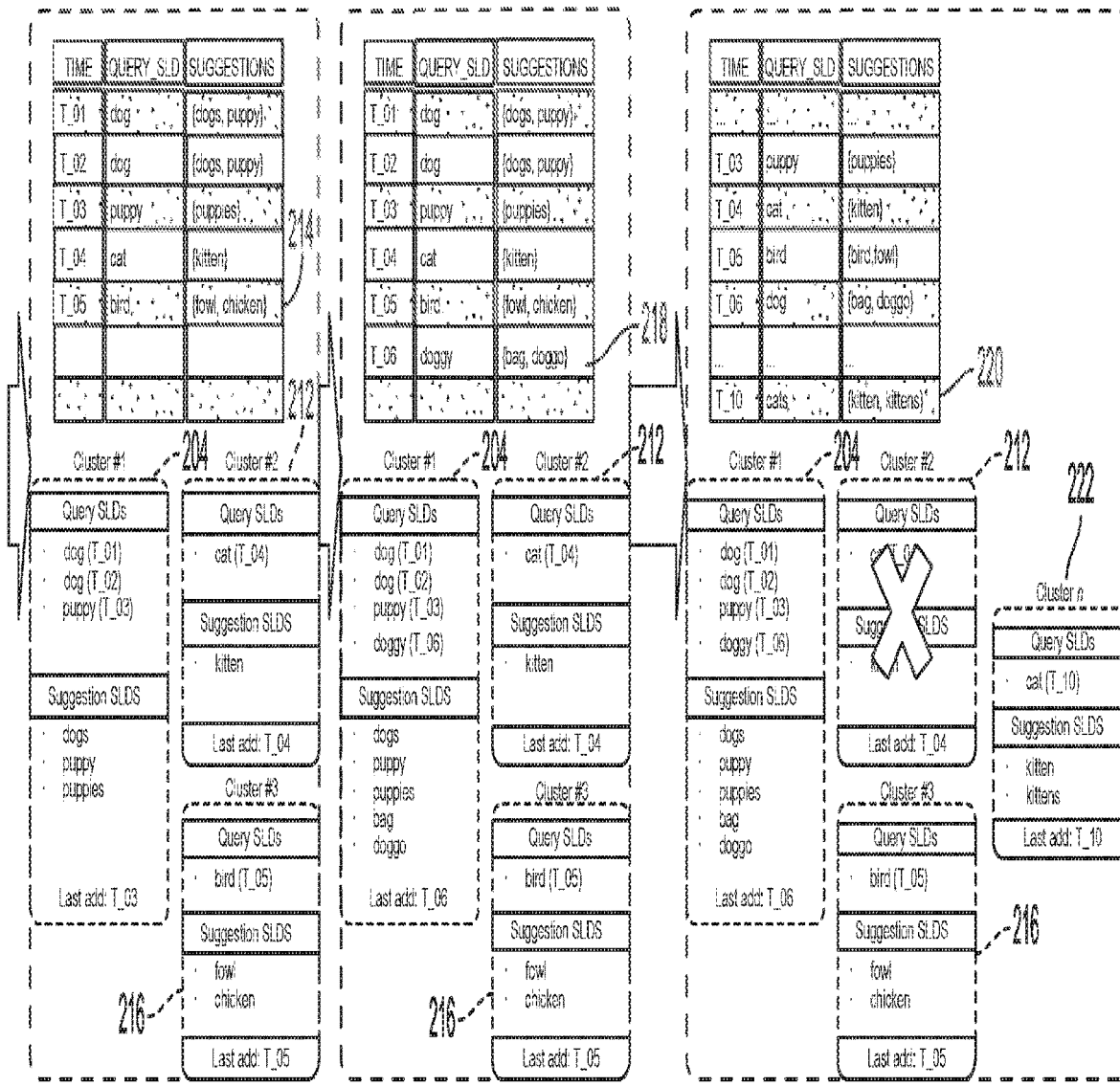
FIG. 3 illustrates a second process flow diagram for identifying a user session.

Referring to FIG. 3, a fifth logged interaction 214 may include the query term "bird" and suggestions "fowl" and "chicken" at a fifth time T_05. According to an embodiment, the query term "bird" of the fifth logged interaction 214 is not the same as the query terms or suggestions of the existing and open clusters, so a third cluster 216 is formed for the fifth logged interaction 214. According to an embodiment, the response server may determine that the query term "bird" of the fifth logged interaction 214 is not similar enough (e.g. above a predetermined threshold) to the query terms and/or suggestions of the existing and open clusters, so a third cluster 216 is formed for the fifth logged interaction 214.

A sixth logged interaction 218 may include the query term "doggy" and suggestions "bag" and "doggo" at a sixth time T_06. Using a membership rule which compares the sixth query term of the sixth logged interaction 218 with one or more queries and/or one or more suggestions of the existing and open clusters, the response server may determine that the query term "doggy" of the sixth logged interaction 218 is similar enough (e.g. above a predetermined threshold) to one or more query terms of the first cluster 204 and/or one or more suggestions of the first cluster 204, so the sixth logged interaction 218 is included in the first cluster 204. According to an embodiment, the sixth time T_06 of the sixth logged interaction 218 may be within a predetermined time after the time stamp of the last added logged interaction.

A tenth logged interaction 220 may include the query term "cats" and suggestions "kitten" and "kittens" at a tenth time T_10. Using a membership rule which compares the tenth query term of the tenth logged interaction 220 with one or more queries and/or one or more suggestions of the existing and open clusters, the response server may determine that the query term "cats" of the tenth logged interaction 220 is not the same as or similar enough (e.g. above a predetermined threshold) to one or more query terms of the existing and open clusters and/or one or more suggestions of the existing and open clusters, so a fourth cluster 222 is formed for the tenth logged interaction 220. For example, although the query term "cats" of the tenth logged interaction 220 is the same or similar to at least one query and/or at least one suggestion of the second cluster 212, the second cluster 212 is closed at the tenth time T_10 because the TTL, expiration parameter, or predetermined amount of time has passed. For example, the closed second cluster 212 may represent an entire user session.

According to an embodiment, a logged interaction may reside or be included in more than one cluster. The effects of multiplicity of including a logged interaction in multiple clusters may be limited by establishing a criteria hierarchy of rules. For example, if a logged interaction can join a cluster on the "repeated query" criteria or a prior suggestion is used as a query, membership rules for other clusters based on similarity of a query or result may be ignored. This may limit the occurrence of including a logged interaction in more than one cluster, or limiting the number of clusters in which a logged interaction is included.

According to an embodiment, a domain name registration may be made as part of the domain name suggestion tool to be better attributed to the creative functionality of the domain name suggestion tool. For example, when a domain name is registered by a user with the domain name suggestion tool or as a result of a suggestion by the domain name suggestion tool, this may be referred to as a conversion. For example, a conversion may refer to when a name that was searched or suggested by the domain name suggestion tool is registered within a predetermined amount of time of the query or suggestion. Conversions may be further broken down into cases where the creative value of the domain name suggestion tool resulted in a registration (e.g. a "value add") versus those where the end user registers the name they initially searched (e.g. an "exact match"). The disclosed system and method can identify more conversions as "value add" than existing approaches, such as, for example, conversions arising from complex user sessions whose query relationships are discovered by existing techniques. Having more "value add" conversions can be beneficial because such conversions demonstrate that the domain name suggestion tool is suggesting names for domains which would not have otherwise been identified.

According to an embodiment, the response server may identify unique user sessions to determine how an end user uses suggestions provided by the response server to develop new queries and convert one or more of the suggestions. According to an embodiment, a conversion may be considered to be when a user registers a domain name suggested by the response server in an identified user session, as explained with respect to various embodiments. According to an embodiment, a conversion may be considered to be when a user makes a purchase as suggested by the response server in an identified user session, such as in contexts outside of domain name suggestion, as explained with respect to various embodiments. Registrations and/or purchases that result from suggestions or responses provided by the response server may be directly attributed to the suggestions or responses provided by the response server (e.g., "value-add conversions").

In addition, each "value add" conversion may indicate an instance where the suggestion algorithm provided a result which was selected by the end user. Over time, the suggestion algorithm can be iteratively modified based on patterns of when the "value add" conversions occurred. In other words, the suggestion algorithm can be iteratively improved when the system recognizes patterns of "value add" suggestions being selected (and/or not selected), then modifies the code to provide improved suggestions based on those patterns. Modification of the code can include replacing the code within the system or response server memory device, or can include modifying weights associated with portions of the suggestion algorithm.

According to an embodiment, the response server may identify user sessions, as explained with respect to various embodiment, in order to statistically characterize user behavior. For example, the identified user sessions may be statistically evaluated to determine how often suggestions are followed or used by the end user, how long the average user session lasts, and/or the rate of abandonment of a user session without registration or purchase.

According to an embodiment, threshold parameters may be set conservatively to avoid "snowball" or "runaway" clusters that, for example, are too inclusive of logged interactions and unlikely to indicate a unique user session. For example, this type of cluster may be referred to as unbounded or otherwise anomalous. A cluster with many logged interactions included, for example, has many strings with which to test the membership criteria against for new logged interactions, increasing the probability of a coincidental match, which may exacerbate the problem by further increasing the size of the match pool. According to an embodiment, the clusters may be processed to remove unbounded or anomalous clusters.

According to an embodiment, it may be desirable to implement a minimum length of search queries or suggestions for membership consideration, for example, on the order of more than a predetermined number of characters in length. The number of predetermined number of characters in length may be, for example, but not limited to 3 characters, 4 characters, 5 characters, 6 characters, or other number of characters. Setting the predetermined number of characters in length for search queries and/or suggestions may avoid coincidental matches from a similarity function or membership rule.

According to an embodiment, the described technique may also be applied to simpler domain searches or availability lookups (e.g., EPP "check" logs). For example, the suggestion fields or sets may be empty. However, comparing the query terms of a plurality of queries may be used to identify user sessions, as explained above.

The disclosed system and method may provide insights about how end-users are interacting with the response server. The described clustering capability may provide knowledge about how users interact with domain search and suggestion services over multiple queries and through different intermediaries or APIs. These insights may improve algorithmic design towards improving responses or suggestions and maximizing conversions.

While specific implementations are described, it should be understood that this is done for illustration purposes only. Other components and configurations may be used without parting from the spirit and scope of the disclosure.

EXAMPLE

According to an embodiment, an example system and method is described. A corresponding response to each query of the plurality of queries may be provided to the query server. Each response may be presented to the user via a web browser. In the example of a domain name suggestion tool, the corresponding response to each query of the plurality of queries may include a registered domain name if the query terms, or related terms, are found. In addition, domain name suggestion tools configured according to this disclosure can return suggested domains.

For example, an end user may enter a character string as an input of the domain name suggestion tool. The character string may be a keyword or a domain name to be searched for availability. The end user may enter the character string via a graphic user interface (GUI) on a client computer. The client computer may communicate with an intermediary computer (e.g., a domain name registrar's computer system) that may further communicate with a computer server on which the domain name suggestion tool is hosted (e.g., a domain name registry's computer server). Thus, the character string as the input of the domain name suggestion tool may be provided to the computer server by the intermediary computer using an intermediary's identifier (ID) on behalf of the end user. The intermediary computer may communicate with the computer server via one or more APIs of the domain name suggestion tool. The intermediary computer may implement the APIs and control the presentation layer back to the end user. In addition, one or more end users may sit behind the single intermediary's ID to use the domain name suggestion tool simultaneously. Upon initiating the search, a domain query log file may be generated, recording the search and any subsequent searches.

As data is collected, analyzed, and grouped into clusters, the system can iteratively improve suggestions being provided to subsequent queries. For example, the system identifies a plurality of user sessions using a domain name suggestion tool. The system may build cluster data structures for identifying user sessions by replaying or analyzing the query log data. This process may be done separately for all unique $NS_x$.IDENTIFIERs, described below, in the log file NS. Log data may refer to, for example, a timestamp ascending, identifier-specific subset of the broader log. According to an embodiment, each query record or row $NS_x$ may be processed sequentially in turn. The migration of inactive clusters to $C_{archived}$ may occur with respect to the current timestamp.

The log file NS may include one or more timestamp-ascending domain query records, e.g., recorded as rows $NS_x$ (such as that provided in Table 1). Each of the domain query records may include an IDENTIFIER data field, a TIME data field, a QUERY_SLD data field, and/or a SUGGESTIONS data field. The IDENTIFIER data field may include an identification ("ID") (e.g., the intermediary's ID) that may be a string identifying who or what is issuing the query when identification is provided. If anonymous usage is supported, the IDENTIFIER data field may be "null," blank, or similarly indicate that no identification was provided. The TIME data field may include a timestamp indicating at which time the domain query was received by the domain name suggestion tool.

The QUERY_SLD data field may include a character string that is a portion of, or the entirety of, the domain query. If the query is a domain name, then the top-level domain (TLD) may be stripped from the query and only the second-level domain (SLD) (e.g. "foo.com" is changed to "foo") may be stored as the character string of the query record. If no TLD is provided, or the query is being interpreted as a keyword search, then that input or query may be stored as the character string of the query record (e.g., "foo"→"foo").

The SUGGESTIONS data field may include a set of domain suggestions generated based on the domain query. The set of domain suggestions may be the domain suggestions which are output by an algorithm of the domain name suggestion tool by a server based on the input, which may be topically similar to the input. These domain suggestion strings can be stored as a set based on topic, user session, etc., and may or may not include the TLD. By processing the log file, the different query records may be grouped or clustered based a determination that the different query records were searched for by the same user according to one or more rules, as described.

According to an embodiment, a timestamp for each log entry in the log file is recorded, for example, as the TIME data field in the domain query log file. Processing the log file may include processing the plurality of log entries sequentially in time according to the timestamp of each log entry in the log. For example, the timestamps for each log entry grouped into the first cluster may indicate the queries were made within a first predetermined time period, and the timestamps for each log entry grouped into the second cluster may indicate the queries were made within a second predetermined time period. In other configurations, the respective clusters can be processed in parallel as additional suggestions are generated.

Individual clusters may be used as a data structure for a user session. In the example domain name suggestion tool, the cluster data structure may be a data structure $C_x$ that combines multiple queries. Each cluster data structure may represent a single end user session. The data structure may also be other suitable data structures for recording associated data, and may contain data fields other than only those for the query and associated time stamps. For example, the cluster data structure $C_x$ may include a CLUSTER_QUERIES data field, a CLUSTER_SUGGS (suggestions based on the query) data field, and a LAST_ADD_TIME data field, indicating the last time a query was made for that user session. When a query record $NS_x$ from the log file NS is classified into a cluster data structure, the CLUSTER_QUERIES data field of this cluster data structure may be updated to append $NS_x$.QUERY_SLD to this list; the CLUSTER_SUGGS data field of this "cluster" data structure may be updated to add all $NS_x$.SUGGESTIONS to this set; and the LAST_ADD_TIME data field of this cluster data structure may be updated to set value to $NS_x$.TIME. In other words, the system can identify that a particular record, $NS_x$ should be associated with a cluster, and in adding the record to the cluster, can update other portions of the cluster accordingly.

According to an embodiment, all clusters, $C_x$, may be maintained in a master list C (i.e., $C_x \in C$) where C may be divided into two distinct subsets, $C_{active}$ and $C_{archived}$, which capture how recently the cluster has been updated. All new clusters may be created in $C_{active}$, but when $C_x$.LAST_ADD_TIME<CUR_REPLAY_TIME+CLUSTER_TTL (that is, when the last update for the current cluster extends beyond the predetermined threshold time for a single session), then $C_x$ may be migrated to $C_{archived}$. The CUR_REPLAY_TIME may be a current timestamp in log history processing. The CLUSTER_TTL may be a variable which is predetermined for determining how long clusters should remain open despite inactivity. The CLUSTER_TTL may be set long enough so that it does not inaccurately truncate a single user session, but not so long that similar queries by different end users become associated by coincidence. The CLUSTER_TTL may be set for any time period, with preference for a value on the order of minutes to hours.

At the end of the log file for a given identifier, there may be additional clusters which may be ready for further analysis. By design and parameter selection, each $C_x \in C$ may represent a single end-user session. Upon processing the log file, the system may identify that those additional clusters should be removed from the log file and added to a distinct cluster, or be otherwise associated with a distinct user.

According to an embodiment, processing the log file may include determining whether a membership rule is satisfied for grouping one or more log entries into an established cluster or whether a new cluster is established for the one or more log entries. Such rules, which may define whether a log entry should be a member of a particular cluster, may include determining whether a first log entry grouped into a first cluster matches, or is similar to, a second log entry with a later timestamp. In such instances, the second log entry may be added to the first cluster, as described above.

According to an embodiment, determining if the membership rule is satisfied may include comparing a first log entry to a second log entry having a later timestamp, then determining if similarity between the first log entry and the query of the second log entry meets a predetermined similarity threshold. The system may also determine whether a domain query being processed is a repeated query, or related to a previous query. For example, the following rules may determine when a log entry is included in a cluster:

(1) If a query $NS_x$ fails to join an existing cluster in accordance with the following rules, then the $NS_x$ will become the first member in a new cluster created and initially stored in $C_{active} \in C$. For example, under this rule, a new cluster would be created for the first log query. In some cases, the system may determine that a new cluster needs to be generated, such as when the domain query is determined not to be the same as one of the domain queries stored in any cluster of an existing user session, and is not sufficiently similar any domain query stored in the existing clusters.

(2) Repeated query: $\forall C_y \in C_{active}$ if $NS_x$.QUERY_SLD$\in C_y$.CLUSTER_QUERIES then add $NS_x$ to cluster $C_y$. For example, if the same second level domain (SLD) was recently queried, the queries should be in the same cluster as they were likely initiated by the same end user. Some repetitions of queries, for example, may be due to a user experimenting with different top level domains (TLDs) that are truncated as described above. The system may determine if the domain query of the domain query record being examined is the same query as one of the domain queries stored in a cluster of an existing user session by comparing the domain query with the domain queries stored in the cluster of the existing user session. If the domain query is the same as another domain query of an existing cluster, the domain query record can then be classified into the cluster of the existing user session. This may include appending the domain query of the domain query record being examined to the list of the domain queries stored in the cluster of the existing user session, adding the set of domain suggestions of the domain query record being examined to the sets of domain suggestions stored in the cluster of the existing user session, and updating the timestamp stored in the cluster of the existing user session as the timestamp of the domain query record being examined.

(3) Suggestion linking: $\forall C_y \in C_{active}$, if $NS_x$.QUERY_SLD$\in C_y$.CLUSTER_SUGGS then add $NS_x$ to cluster $C_y$. For example, if a SLD is queried was recently suggested based on a different query, those queries may be included into the same cluster.

(4) String similarity: If [SIMILAR_ENOUGH($NS_x$.QUERY_SLD, s)=true, $\forall s \in (C_y$.CLUSTER_QUERIES$\cup C_y$.CLUSTER_SUGGS), $\forall C_y \in C_{active}$] then add $NS_x$ to cluster $C_y$. For example, if a query string is "similar enough" to either a recently queried or recently suggested name, then the query may join that cluster.

The system may determine whether the domain query is similar to a previous domain query or a domain name suggestion. This determination may be performed using the one or more similarity functions and the similarity-determining function as described above. If the domain query is similar, the domain query record may be appended to the list of the domain queries stored in the cluster of the existing user session. In addition, the timestamp of the cluster can be updated, reflecting that the cluster is active. According to an embodiment, the function SIMILAR_ENOUGH( ) may have different requirements internally for the "recently queried" versus "recently suggested" cases.

For example, in the domain name suggestion tool, one or more similarity functions, as indicated by the function SIMILAR_ENOUGH( ) may be defined. The similarity function may receive a first character string and a second character string as inputs, and generate a similarity value that indicates how similar the first character string and the second character string. For example, a similarity function SIMILARITY($s_1$, $s_2$), that takes two strings ($s_1$ and $s_2$) as input, and outputs a threshold-capable value (e.g., on a scale [0,1]) that indicates how similar the strings are.

The similarity function may be any suitable similarity function. As explained above, for example, the similarity function may be a Levenshtein distance (LEV) function. The LEV function counts the number of character insertions, deletions, or substitutions needed to transform $s_1$ to $s_2$, then, normalizes this by max (length($s_1$), length($s_2$)) to put the output on [0,1].

As another example, the similarity function may be a longest common subsequence (LCS). The LCS function identifies the longest subsequence of $s_1$ and $s_2$. The subsequences do not have to be composed of consecutive characters. From this, length (LCS($s_1$, $s_2$))/min(length($s_1$), length ($s_2$)) can produce a threshold-friendly value on [0,1].

As yet another example, the similarity function can use synonyms and/or antonyms to measure how similar in meaning respective strings are to one another.

One or more similarity thresholds corresponding to the one or more similarity functions may be defined. The similarity thresholds may be compared with corresponding similarity values generated from the one or more similarity functions. For example, using both LEV and LCS, four thresholds may be set: THRESH_LEV_QUERY, THRESH_LEV_SUGGS, THRESH_LCS_QUERY, and THRESH_LCS_SUGGS. The THRESH_LEV_QUERY threshold may be used to compare a first query and a second query based on the LEV function. The THRESH_LEV_SUGGS threshold may be used to compare a query and a suggestion based on the LEV function. The THRESH_LCS_QUERY threshold may be used to compare a first query and a second query based on the LCS function. The THRESH_LCS_SUGGS threshold may be used to compare a query and a suggestion based on the LCS function.

According to an embodiment, a similarity function may receive the similarity thresholds and the corresponding similarity values as inputs and determine whether two character strings with the corresponding similarity values can be classified into one user session. For example, the similarity function may define what similarity values are similar enough (e.g. meeting at least a predetermined threshold of similarity) to associate, for example, two query strings, or a query string and a suggestion string. This distinction may determine that more stringent interpretations of similarity are needed due to the one-to-many relationship of query strings to suggestions. The similarity-determining function may be a binary function that wraps thresholds and threshold aggregation when using multiple similarity functions. For example, using both LEV and LCS and four thresholds of THRESH_LEV_QUERY, THRESH_LEV_SUGGS, THRESH_LCS_QUERY, and THRESH_LCS_SUGGS a similarity function, SIMILAR_ENOUGH($s_1$, $s_2$), may compare the two LEV and LCS outputs against the corresponding thresholds. The final output may be made binary using "OR" (either similarity value is above threshold), or "AND" (both similarity values are above threshold) logic. If using more than two similarity functions, a voting system may be used to determine an output of the similarity function.

The log file may be processed based on one or more membership rules, as described above. For example, the domain query log file may be processed to classify the cluster data structures for identifying user sessions based on the steps explained above, and the cluster membership rules.

Figure 4:
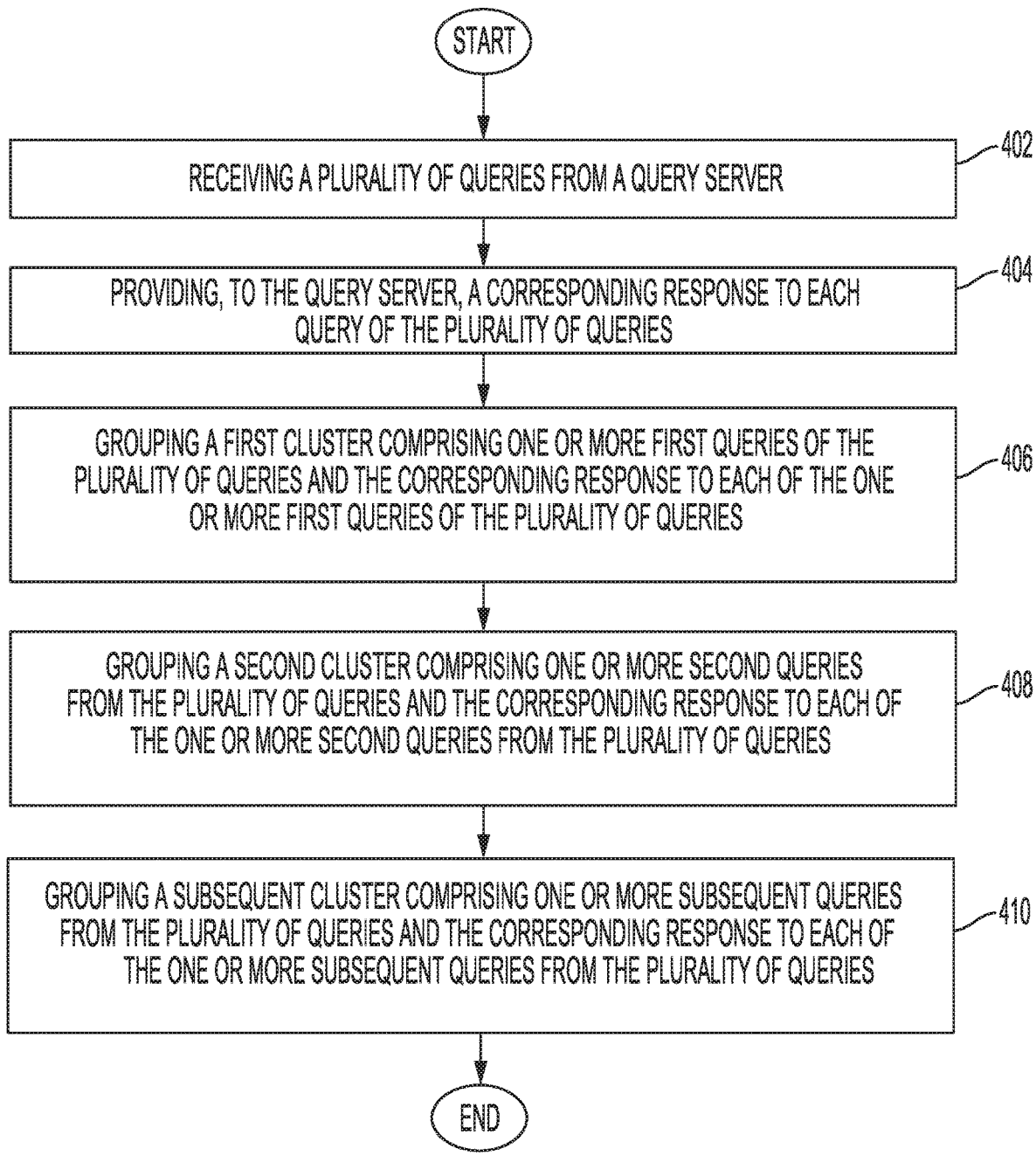
FIG. 4 illustrates an example method embodiment.

FIG. 4 illustrates an example method according to an embodiment. As illustrated, the system receives a plurality of queries from a query server 402 and provides, to the query server, a corresponding response to each query of the plurality of queries 404. For example, the queries and corresponding responses may be interspersed at different times without limitation. Some queries may be received simultaneously by the query server, some responses may be provided simultaneously from the system, and some queries and responses may be simultaneously received and provided, respectively. The system may group one or more of the queries, and corresponding responses, into different clusters to identify a plurality of different user sessions. As explained above, the different clusters may be grouped or formed based on one or a combination of different rules. For example, the system may group a first cluster comprising one or more first queries of the plurality of queries and the corresponding response to each of the one or more first queries of the plurality of queries, wherein the first cluster identifies a first user session 406. The system may group a second cluster comprising one or more second queries from the plurality of queries and the corresponding response to each of the one or more second queries from the plurality of queries, wherein the second cluster identifies a second user session 408. The system may group any number of subsequent clusters comprising one or more subsequent queries from the plurality of queries and the corresponding response to each of the one or more subsequent queries from the plurality of queries, wherein the subsequent cluster identifies a subsequent user session 410. Any number of clusters may be grouped by the system, depending on the rules and/or the number of different user sessions.

According to an embodiment, the different clusters may be grouped, according to one or more membership rules, in any order. According to an embodiment, one or more of the queries and corresponding responses may be included in the different clusters, according to one or more membership rules, in any order. For example, a query and corresponding response may be included, according to one or more membership rules, in the first cluster after the second and/or subsequent clusters are formed.

According to an embodiment, the plurality of queries from the query server do not identify different unique users or user sessions.

According to an embodiment, the method can further include creating a log having a plurality of log entries, where each log entry of the plurality of log entries includes a single query and the corresponding response to the single query, and processing the log, wherein processing the log includes grouping the plurality of different clusters, as explained above. In some cases where the method includes such steps, the processing of the log can include determining whether a rule is satisfied for grouping one or more log entries into one of the plurality of clusters.

The method may further include recording a timestamp for each log entry in the log, where processing the log includes processing the plurality of log entries sequentially in time according to the timestamp of each log entry in the log, where the timestamp for each log entry grouped into a first cluster, for example, are within a first predetermined time period, and where the timestamp for each log entry grouped into a second cluster, for example, are within a second predetermined time period. In such cases, determining the rule is satisfied can include determining a first log entry grouped into the first cluster has the same query as a second log entry with a later timestamp. Alternatively, determining the rule is satisfied can include determining a response provided in a first log entry is the same as a query of a second log entry having a later timestamp. As yet another alternative, determining the rule is satisfied can include: comparing a first log entry to a second log entry having a later timestamp, and determining similarity between the first log entry and the query of the second log entry meets a predetermined similarity threshold.

According to an embodiment, each query of the plurality of queries can include at least a keyword for a domain name, and the corresponding response to each query of the plurality of queries comprises a domain name.

Figure 5:
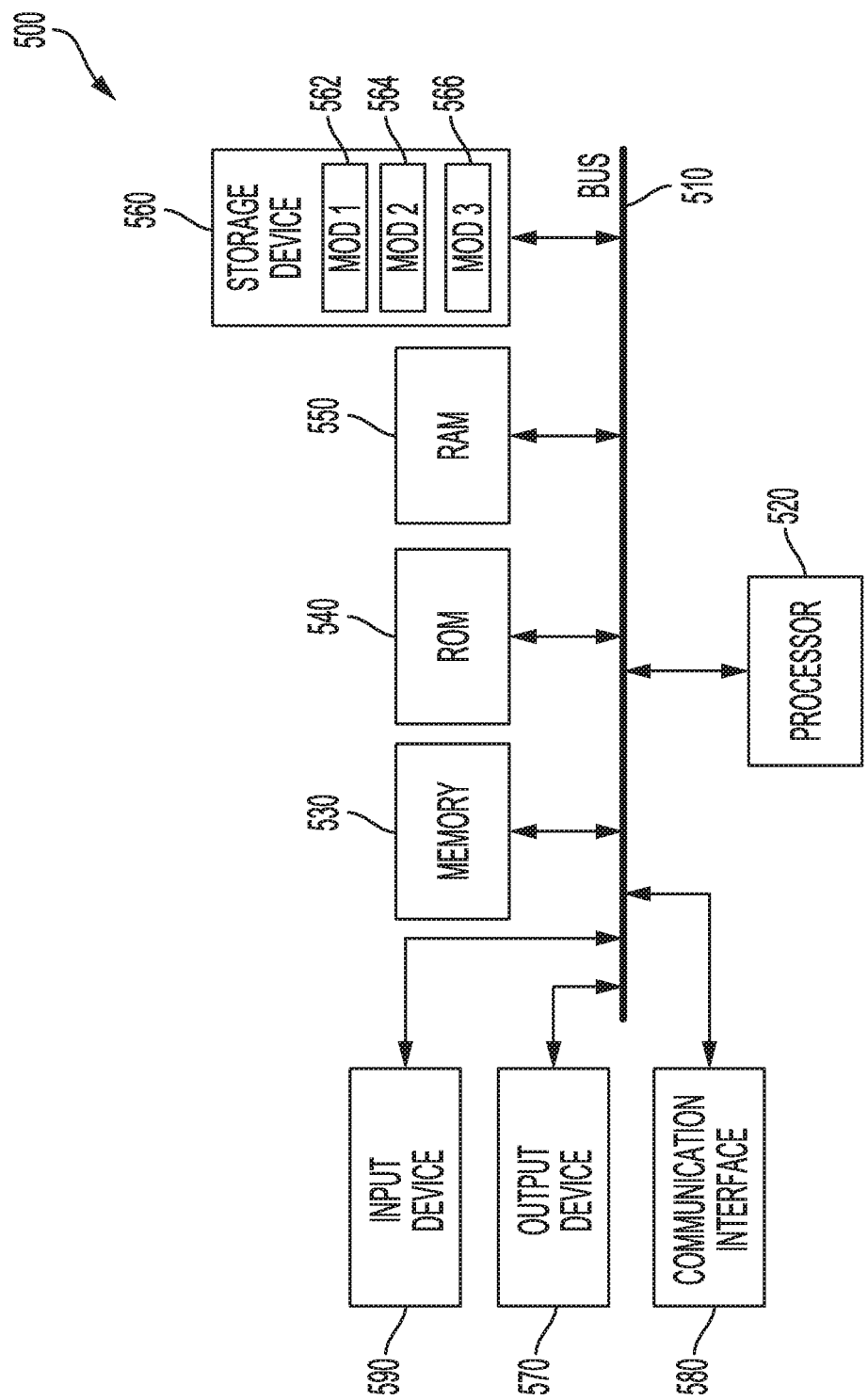
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method for identifying a user session for suggesting domain names for registration, the method comprising:
    receiving a plurality of queries from a query server, wherein the plurality of queries from the query server do not identify different user sessions, and wherein each query of the plurality of queries comprises at least a keyword for a domain name;
    providing, to the query server, a corresponding response to each query of the plurality of queries, wherein the corresponding response to each query of the plurality of queries comprises one or more domain names suggested by a suggestion algorithm;
    grouping a plurality of clusters, wherein each cluster of the plurality of clusters comprises one or more queries of the plurality of queries and the corresponding response to each of the one or more queries of the plurality of queries;
    processing the plurality of clusters to remove unbounded or anomalous clusters, wherein the unbounded or anomalous clusters exceed a threshold parameter, wherein the clusters of the plurality of clusters each indicate a different user session;
    determining, based on the processed clusters, a user query and/or registration pattern;
    modifying, based on the user query and/or registration pattern, the suggestion algorithm, and
    providing, to the query server, a new response to a new query having at least the keyword for the domain name based on the modified suggestion algorithm, the new response comprising updated domain names suggested by the modified suggestion algorithm.

2. The method of claim 1, further comprising:
    creating a log having a plurality of log entries, wherein each log entry of the plurality of log entries comprises one query and the corresponding response to the one query; and
    processing the log, wherein processing the log comprises grouping the plurality of clusters,
    wherein grouping the plurality of clusters comprises grouping a first cluster comprising one or more first queries of the plurality of queries and the corresponding response to each of the one or more first queries of the plurality of queries; and
    grouping a second cluster comprising one or more second queries from the plurality of queries and the corresponding response to each of the one or more second queries from the plurality of queries.

3. The method of claim 2, further comprising:
    recording a timestamp for each log entry in the log,
    wherein processing the log comprises processing the plurality of log entries sequentially in time according to the timestamp of each log entry in the log,
    wherein the timestamp for each log entry grouped into the first cluster are within a first predetermined time period, and
    wherein the timestamp for each log entry grouped into the second cluster are within a second predetermined time period.

4. The method of claim 2, wherein processing the log comprises determining whether a rule is satisfied for grouping one or more log entries into the first cluster or the second cluster.

5. The method of claim 4, wherein determining the rule is satisfied comprises determining a first log entry grouped into the first cluster has the same query as a second log entry with a later timestamp.

6. The method of claim 4, wherein determining the rule is satisfied comprises determining a response provided in a first log entry is the same as a query of a second log entry having a later timestamp.

7. The method of claim 4, wherein determining the rule is satisfied comprises:
    comparing a first log entry to a second log entry having a later timestamp;
    determining similarity between the first log entry and the query of the second log entry meets a predetermined similarity threshold.

8. The method of claim 1, wherein processing the plurality of clusters to remove unbounded or anomalous clusters comprises setting the threshold parameter to a value that reduces the probability of a coincidental match between a new interaction and logged interactions within each of the plurality of clusters.

9. A system comprising:
    a processor; and
    a computer-readable storage medium storing instructions which, when executed by the processor, cause the processor to perform a method for identifying a user session for suggesting domain names for registration comprising:
        receiving a plurality of queries from a query server, wherein each query of the plurality of queries comprises at least a keyword for a domain name;
        providing, to the query server, a corresponding response to each query of the plurality of queries, wherein the corresponding response to each query of the plurality of queries comprises one or more domain names suggested by a suggestion algorithm;
        grouping a plurality of clusters, wherein each cluster of the plurality of clusters comprises one or more queries of the plurality of queries and the corresponding response to each of the one or more queries of the plurality of queries;
        processing the plurality of clusters to remove unbounded or anomalous clusters, wherein the unbounded or anomalous clusters exceed a threshold parameter, wherein the clusters of the plurality of clusters each indicate a different user session;
        determining, based on the processed clusters, a user query and/or registration pattern;
        modifying, based on the user query and/or registration pattern, the suggestion algorithm; and
        providing, to the query server, a new response to a new query having at least the keyword for the domain name based on the modified suggestion algorithm, the new response comprising updated domain names suggested by the modified suggestion algorithm.

10. The system of claim 9, wherein the plurality of queries from the query server do not identify different user sessions.

11. The system of claim 9, the computer-readable storage medium further stores instructions which result in the method further comprising:
    creating a log having a plurality of log entries, wherein each log entry of the plurality of log entries comprises one query and the corresponding response to the one query; and
    processing the log, wherein processing the log comprises grouping the plurality of clusters, wherein grouping the plurality of clusters comprises grouping a first cluster comprising one or more first queries of the plurality of queries and the corresponding response to each of the one or more first queries of the plurality of queries; and grouping a second cluster comprising one or more second queries from the plurality of queries and the corresponding response to each of the one or more second queries from the plurality of queries.

12. The system of claim 11, the computer-readable storage medium further stores instructions which result in the method further comprising:

recording a timestamp for each log entry in the log, wherein processing the log comprises processing the plurality of log entries sequentially in time according to the timestamp of each log entry in the log, wherein the timestamp for each log entry grouped into the first cluster are within a first predetermined time period, and wherein the timestamp for each log entry grouped into the second cluster are within a second predetermined time period.

13. The system of claim 11, wherein processing the log comprises determining whether a rule is satisfied for grouping one or more log entries into the first cluster or the second cluster.

14. The system of claim 13, wherein determining the rule is satisfied comprises determining a first log entry grouped into the first cluster has the same query as a second log entry with a later timestamp.

15. The system of claim 13, wherein determining the rule is satisfied comprises determining a response provided in a first log entry is the same as a query of a second log entry having a later timestamp.

16. The system of claim 13, wherein determining the rule is satisfied comprises:

comparing a first log entry to a second log entry having a later timestamp;

determining similarity between the first log entry and the query of the second log entry meets a predetermined similarity threshold.

17. The system of claim 9, wherein processing the plurality of clusters to remove unbounded or anomalous clusters comprises setting the threshold parameter to a value that reduces the probability of a coincidental match between a new interaction and logged interactions within each of the plurality of clusters.

18. A non-transitory computer-readable storage medium storing instructions which, when executed by a computing device, cause the computing device to perform a method for identifying a user session for suggesting domain names for registration comprising:

receiving a plurality of queries from a query server, wherein each query of the plurality of queries comprises at least a keyword for a domain name;

providing, to the query server, a corresponding response to each query of the plurality of queries, wherein the corresponding response to each query of the plurality of queries comprises one or more domain names suggested by a suggestion algorithm;

grouping a plurality of clusters, wherein each cluster of the plurality of clusters comprises one or more queries of the plurality of queries and the corresponding response to each of the one or more queries of the plurality of queries;

processing the plurality of clusters to remove unbounded or anomalous clusters, wherein the unbounded or anomalous cluster exceed a threshold parameter, wherein the clusters of the plurality of clusters each indicate a different user session;

determining, based on the processed clusters, a user query and/or registration pattern;

modifying, based on the user query and/or registration pattern, the suggestion algorithm; and providing, to the query server, a new response to a new query having at least the keyword for the domain name based on the modified suggestion algorithm, the new response comprising updated domain names suggested by the modified suggestion algorithm.

19. The non-transitory computer-readable storage medium of claim 18, wherein the plurality of queries from the query server do not identify different user sessions.

20. The non-transitory computer-readable storage medium of claim 18, wherein processing the plurality of clusters to remove unbounded or anomalous clusters comprises setting the threshold parameter to a value that reduces the probability of a coincidental match between a new interaction and logged interactions within each of the plurality of clusters.

* * * * *